US012499770B2

(12) United States Patent
S et al.

(10) Patent No.: US 12,499,770 B2
(45) Date of Patent: Dec. 16, 2025

(54) SYSTEM AND METHOD TO INTUITIVELY REPRESENT THE SEPARATION OF AIRCRAFT TRAFFIC

(71) Applicant: HONEYWELL INTERNATIONAL INC., Charlotte, NC (US)

(72) Inventors: Anoop S, Bangalore (IN); Sadguni Venkataswamy, Bangalore (IN); Gang He, Morris Plains, NJ (US); David Wright, Phoenix, AZ (US); Robin Girdhar, Bangalore (IN); Naseeruddin Mohammed, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 169 days.

(21) Appl. No.: 18/461,224

(22) Filed: Sep. 5, 2023

(65) Prior Publication Data

US 2024/0428691 A1 Dec. 26, 2024

(51) Int. Cl.
*G08G 5/21* (2025.01)
*B64D 43/02* (2006.01)
*G08G 5/51* (2025.01)

(52) U.S. Cl.
CPC ............... *G08G 5/21* (2025.01); *B64D 43/02* (2013.01); *G08G 5/51* (2025.01)

(58) Field of Classification Search
CPC ............. G08G 5/21; G08G 5/51; B64D 43/02
USPC .......................................................... 701/120
See application file for complete search history.

(56) References Cited

U.S. PATENT DOCUMENTS

| | | | | |
|---|---|---|---|---|
| 7,062,364 | B2 | 6/2006 | Maris | |
| 8,989,998 | B2 | 3/2015 | Le et al. | |
| 9,501,936 | B2 | 11/2016 | Trefilova et al. | |
| 9,520,065 | B2 | 12/2016 | Aymeric et al. | |
| 9,815,567 | B2 | 11/2017 | Fucke | |
| 10,741,149 | B2 | 8/2020 | Bouda et al. | |
| 10,971,020 | B1 | 4/2021 | Fannin et al. | |
| 11,348,469 | B2 | 5/2022 | Manberg et al. | |
| 2011/0006918 | A1* | 1/2011 | Shafaat .................... | G08G 5/21 340/945 |
| 2014/0297169 | A1 | 10/2014 | Le et al. | |
| 2016/0318446 | A1* | 11/2016 | Van Steenkist .......... | G08G 5/80 |

(Continued)

FOREIGN PATENT DOCUMENTS

EP 3796287 A1 3/2021

*Primary Examiner* — Isaac G Smith
(74) *Attorney, Agent, or Firm* — Ingrassia Fisher & Lorenz LLP

(57) ABSTRACT

A method and system for dynamically representing the separation for air traffic has been developed. First, air traffic is detected which requires maintenance of a separation distance from an ownship aircraft. The ground speed of the ownship, the ground speed of the air traffic and the current separation distance is determined. A predicted separation distance is calculated following a specific time interval. The predicted separation distance between the air traffic and the ownship is based on a differential in ground speed between the air traffic and the ownship and the specific time interval. The location of the air traffic, the separation distance and the predicted separation distance are all shown on a graphical display onboard the ownship. The separation distance and the predicted separation distance are represented on a non-linear scale on the graphical display.

20 Claims, 7 Drawing Sheets

(56) References Cited

U.S. PATENT DOCUMENTS

| | | | | |
|---|---|---|---|---|
| 2017/0032576 | A1* | 2/2017 | Mazoyer | B64D 43/00 |
| 2017/0130366 | A1 | 5/2017 | Yasufuku et al. | |
| 2019/0362690 | A1* | 11/2019 | Bouda | G08G 5/21 |
| 2021/0134164 | A1 | 5/2021 | Bouda et al. | |
| 2021/0375144 | A1* | 12/2021 | Bouda | G08G 5/53 |

* cited by examiner

SYSTEM AND METHOD TO INTUITIVELY REPRESENT THE SEPARATION OF AIRCRAFT TRAFFIC

CROSS REFERENCE TO RELATED APPLICATION

The present application claims benefit of prior filed India Provisional Patent Application No. 202311042648, filed Jun. 26, 2023, which is hereby incorporated by reference herein in its entirety.

TECHNICAL FIELD

The present invention generally relates to aircraft instrumentation, and more particularly relates to a system and method to intuitively represent the separation of aircraft traffic.

BACKGROUND

Monitoring air traffic separation is very cognitive demanding such as traffic information presented on a display along with the accompanying textual information such as distance and a closure rate. Such displays and information are often hectic and confusing and may lead to the pilot misjudging the information presented. Hence, there is a need for a system and method to intuitively represent the separation of aircraft traffic for aircrews.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for dynamically representing the separation for air traffic. The method comprises: detecting air traffic requiring maintenance of a separation distance from an ownship aircraft; determining a ground speed of the ownship aircraft; determining a ground speed of the air traffic and a current separation distance from the ownship aircraft; calculating a predicted separation distance following a specific time interval, where the predicted separation distance between the air traffic and the ownship aircraft is based on a differential in ground speed between the air traffic and the ownship aircraft and the specific time interval; and displaying the location of the air traffic, the separation distance and the predicted separation distance on a graphical display onboard the ownship aircraft, where the separation distance and the predicted separation distance are represented on a non-linear scale on the graphical display.

A system is provided for dynamically representing the separation for air traffic. The system comprises: a control module located onboard the ownship aircraft, where the control module, detects air traffic requiring maintenance of a separation distance from an ownship aircraft, determines a ground speed of the ownship aircraft, determines a ground speed of the air traffic and a current separation distance from the ownship aircraft, and calculates a predicted separation distance following a specific time interval, where the predicted separation distance between the air traffic and the ownship aircraft is based on a differential in ground speed between the air traffic and the ownship aircraft and the specific time interval; and a display system located onboard the ownship aircraft, where the display system, displays the location of the air traffic, the separation distance and the predicted separation distance on a graphical display onboard the ownship aircraft, where the separation distance and the predicted separation distance are represented on a non-linear scale on the graphical display, and dynamically adjusts the non-linear scale on the graphical display as the air traffic approaches the predicted separation distance.

Furthermore, other desirable features and characteristics of intuitively representing the separation of aircraft traffic will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
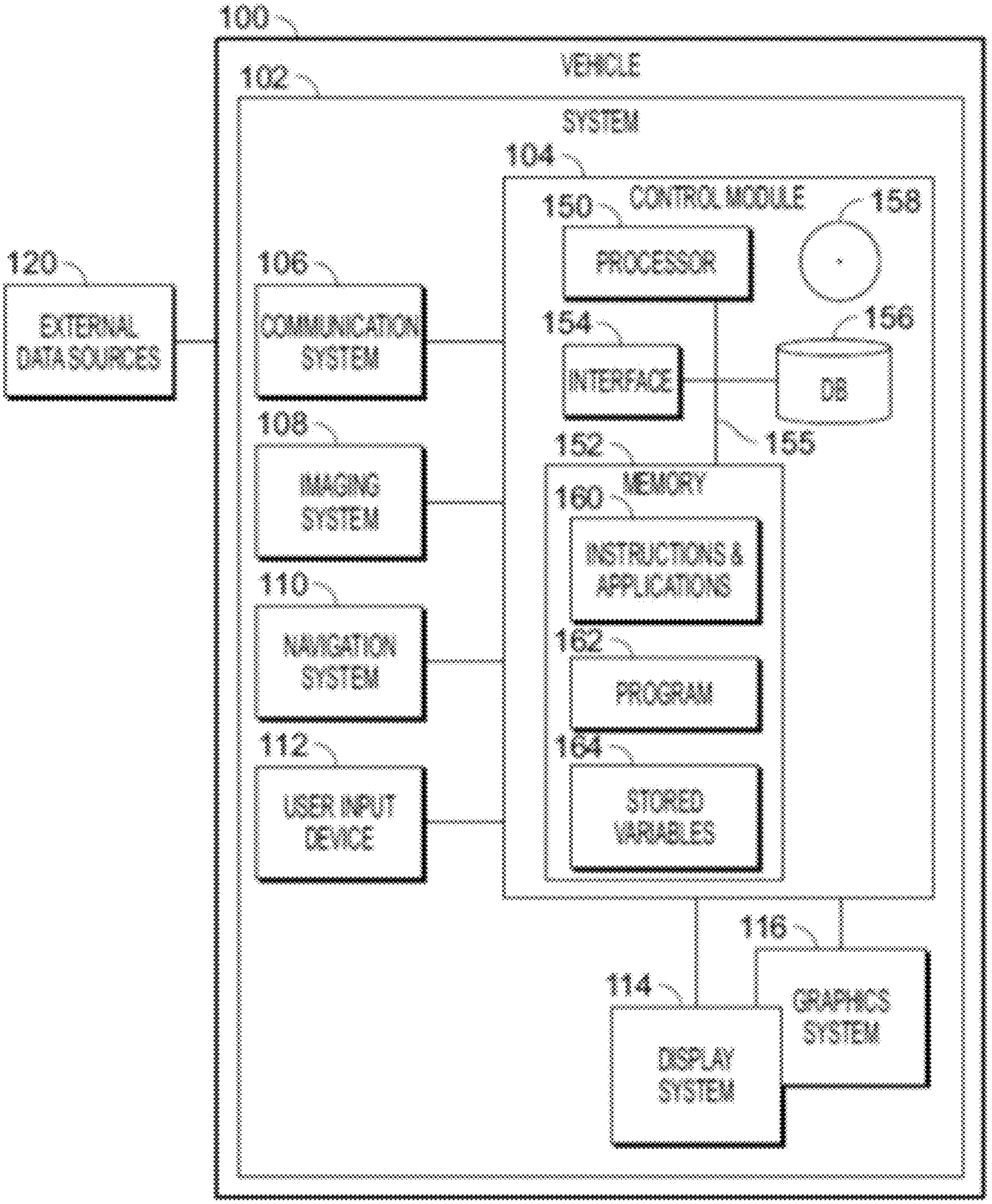
FIG. 1 shows a vehicle system that includes a display system in accordance with some embodiments.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for dynamically representing the separation for air traffic has been developed. The method and system are used to follow another aircraft ("target to follow" or TTF) during certain flight procedures such as following another aircraft on a landing approach. The present examples described herein refer to an application for a single aircraft. However, other embodiments could be applied to multiple aircraft. An on-board traffic computer (i.e., an "imaging system") uses automatic dependent surveillance broadcast (ADSB to detect aircraft in the area which is presented to the pilot on a display. If the pilot is instructed by air traffic control (ATC) to follow a particular aircraft at an indicated distance, the pilot selects the indicated aircraft to follow. The display elements discussed herein allow the pilot to monitor the distance between the target aircraft and the own ship. The display gives an indication of the current distance between the two aircraft as well as the predicted location of the target aircraft (e.g., closer or farther away) at some time interval in the future.

In actual operation, air traffic is detected which requires maintenance of a separation distance from an ownship aircraft. The ground speed of the ownship, the ground speed of the air traffic and the current separation distance is determined. The pilot enters a "distance" that the own ship is to follow the target aircraft. The display shows the current distance between the two aircraft as well as a predicted location of the target aircraft at some point in the immediate future. A predicted separation distance is calculated following a specific time interval. The predicted separation distance between the air traffic and the ownship is based on a differential in ground speed between the air traffic and the ownship and the time interval. The location of the air traffic, the separation distance and the predicted separation distance are all shown on a graphical display onboard the ownship. The separation distance and the predicted separation distance are represented on a non-linear scale on the graphical display. The non-linear scale is dynamically adjusted as the air traffic approaches the predicted separation distance.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may be separate from, or integrated within, a preexisting mobile platform management system, avionics system, or aircraft flight management system (FMS).

Turning now to FIG. 1, in the depicted embodiment, the vehicle system 102 includes: the control module 104 that is operationally coupled to a communication system 106, an imaging system 108, a navigation system 110, a user input device 112, a display system 114, and a graphics system 116. The operation of these functional blocks is described in more detail below. In the described embodiments, the depicted vehicle system 102 is generally realized as an aircraft flight deck display system within a vehicle 100 that is an aircraft; however, the concepts presented here can be deployed in a variety of mobile platforms, such as land vehicles, spacecraft, watercraft, and the like. Accordingly, in various embodiments, the vehicle system 102 may be associated with or form part of larger aircraft management system, such as a flight management system (FMS).

In the illustrated embodiment, the control module 104 is coupled to the communications system 106, which is configured to support communications between external data source(s) 120 and the aircraft. External source(s) 120 may comprise air traffic control (ATC), or other suitable command centers and ground locations. In some embodiments, the pilot gets instructions from the ATC via radio about TTF. In this regard, the communication system 106 may be realized using a radio communication system or another suitable data link system.

The imaging system 108 (e.g., an aircraft traffic computer using ADSB to detect other aircraft in the area) is configured to use sensing devices to generate video or still images, and provide image data therefrom. The imaging system 108 may comprise one or more sensing devices, such as cameras, each with an associated sensing method. Accordingly, the video or still images generated by the imaging system 108 may be referred to herein as generated images, sensor images, or sensed images, and the image data may be referred to as sensed data. In an embodiment, the imaging system 108 comprises an infrared ("IR") based video camera, low-light TV camera, or a millimeter wave (MMW) video camera. The IR camera senses infrared radiation to create an image in a manner that is similar to an optical camera sensing visible light to create an image. In another embodiment, the imaging system 108 comprises a radar based video camera system. Radar based systems emit pulses of electromagnetic radiation and listen for, or sense, associated return echoes. The radar system may generate an image or video based upon the sensed echoes. In another embodiment, the imaging system 108 may comprise a sonar system. The imaging system 108 uses methods other than visible light to generate images, and the sensing devices within the imaging system 108 are much more sensitive than a human eye. Consequently, the generated images may comprise objects, such as mountains, buildings, or ground objects, that a pilot might not otherwise see due to low visibility conditions.

In various embodiments, the imaging system 108 may be mounted in or near the nose of the aircraft (vehicle 100) and calibrated to align an imaging region with a viewing region of a primary flight display (PFD) or a Head Up display (HUD) rendered on the display system 114. For example, the imaging system 108 may be configured so that a geometric center of its field of view (FOV) is aligned with or otherwise corresponds to the geometric center of the viewing region on the display system 114. In this regard, the imaging system 108 may be oriented or otherwise directed substantially parallel to an anticipated line-of-sight for a pilot and/or crew member in the cockpit of the aircraft to effectively capture a forward looking cockpit view in the respective displayed image. In some embodiments, the displayed images on the display system 114 are three dimensional, and the imaging system 108 generates a synthetic perspective view of terrain in front of the aircraft. The synthetic perspective view of terrain in front of the aircraft is generated to match the direct out-the-window view of a crew member, and may be based on the current position, attitude, and pointing information received from a navigation system 110, or other aircraft and/or flight management systems.

Navigation system 110 is configured to provide real-time navigational data and/or information regarding operation of the aircraft. The navigation system 110 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 110, as will be appreciated in the art. The navigation system 110 is capable of obtaining and/or determining the current or instantaneous speed as well position and location information of the aircraft (e.g., the current latitude and longitude) and the current altitude or above ground level for the aircraft. Additionally, in an exemplary embodiment, the navigation system 110 includes inertial reference sensors capable of obtaining or otherwise determining the attitude or orientation (e.g., the pitch, roll, and yaw, heading) of the aircraft relative to earth.

The user input device 112 is coupled to the control module 104, and the user input device 112 and the control module 104 are cooperatively configured to allow a user (e.g., a pilot, co-pilot, or crew member) to interact with the display system 114 and/or other elements of the vehicle system 102 in a conventional manner. The user input device 112 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. In embodiments using a touch sensitive screen, the user input device 112 may be integrated with a display device. Non-limiting examples of uses for the user input device 112 include: entering values for stored variables 164, loading or updating instructions and applications 160, and loading and updating the contents of the database 156, each described in more detail below.

The generated images from the imaging system 108 are provided to the control module 104 in the form of image data. The control module 104 is configured to receive the image data and convert and render the image data into display commands that command and control the renderings of the display system 114. This conversion and rendering may be performed, at least in part, by the graphics system 116. In some embodiments, the graphics system 116 may be integrated within the control module 104; in other embodiments, the graphics system 116 may be integrated within the display system 114. Regardless of the state of integration of these subsystems, responsive to receiving display commands from the control module 104, the display system 114 displays, renders, or otherwise conveys one or more graphical representations or displayed images based on the image data (i.e., sensor based images) and associated with operation of the vehicle 100, as described in greater detail below. In various embodiments, images displayed on the display system 114 may also be responsive to processed user input that was received via a user input device 112.

In general, the display system 114 may include any device or apparatus suitable for displaying flight information or other data associated with operation of the aircraft in a format viewable by a user. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In practice, the display system 114 may be part of, or include, a primary flight display (PFD) system, a panel-mounted head down display (HDD), a head up display (HUD), or a head mounted display system, such as a "near to eye display" system. The display system 114 may comprise display devices that provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology.

As mentioned, the control module 104 performs the functions of the vehicle system 102. With continued reference to FIG. 1, within the control module 104, the processor 150 and the memory 152 (having therein the program 162) form a novel processing engine that performs the described processing activities in accordance with the program 162, as is described in more detail below. The control module 104 generates display signals that command and control the display system 114.

The control module 104 includes an interface 154, communicatively coupled to the processor 150 and memory 152 (via a bus 155), database 156, and an optional storage disk 158. In various embodiments, the control module 104 performs actions and other functions in accordance with other embodiments. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152, the database 156, or a disk 158 maintain data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164. The database 156 and the disk 158 are computer readable storage media in the form of any suitable type of storage apparatus, including direct access storage devices such as hard disk drives, flash systems, floppy disk drives and optical disk drives. The database may include an airport database (comprising airport features) and a terrain database (comprising terrain features). In combination, the features from the airport database and the terrain database are referred to map features. Information in the database 156 may be organized and/or imported from an external source 120 during an initialization step of a process.

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The interface 154 enables communications within the control module 104, can include one or more network interfaces to communicate with other systems or components, and can be implemented using any suitable method and apparatus. For example, the interface 154 enables communication from a system driver and/or another computer system. In one embodiment, the interface 154 obtains data from external data source(s) 120 directly. The interface 154 may also include one or more network interfaces to communicate with technicians, and/or one or more storage interfaces to connect to storage apparatuses, such as the database 156.

It will be appreciated that the vehicle system 102 may differ from the embodiment depicted in FIG. 1. As mentioned, the vehicle system 102 can be integrated with an existing flight management system (FMS) or aircraft flight deck display.

During operation, the processor 150 loads and executes one or more programs, algorithms and rules embodied as instructions and applications 160 contained within the memory 152 and, as such, controls the general operation of the control module 104 as well as the vehicle system 102. In executing the process described herein, the processor 150 specifically loads and executes the novel program 162. Additionally, the processor 150 is configured to process received inputs (any combination of input from the communication system 106, the imaging system 108, the navigation system 110, and user input provided via user input device 112), reference the database 156 in accordance with the program 162, and generate display commands that command and control the display system 114 based thereon.

There is a need for a coordinated cockpit display which correlates the three dimensional (3D) designated traffic display and a way to easily identify the current distance between the designated traffic and ownship aircraft in order to know the predicted separation distance in the designated traffic. For example, the distance required to maintain between the preceding air traffic and ownship may vary typically from 0.5 NM to 8 NM. Representing such distance on a linear scale would take up a lot of display space. In general, when the designated air traffic is closer, better separation awareness is necessary to keep safe following distance at acceptable closure rate. Given limited display space, the displayed symbol on a non-linear scale is needed to provide better awareness for this need.

Figure 2A:
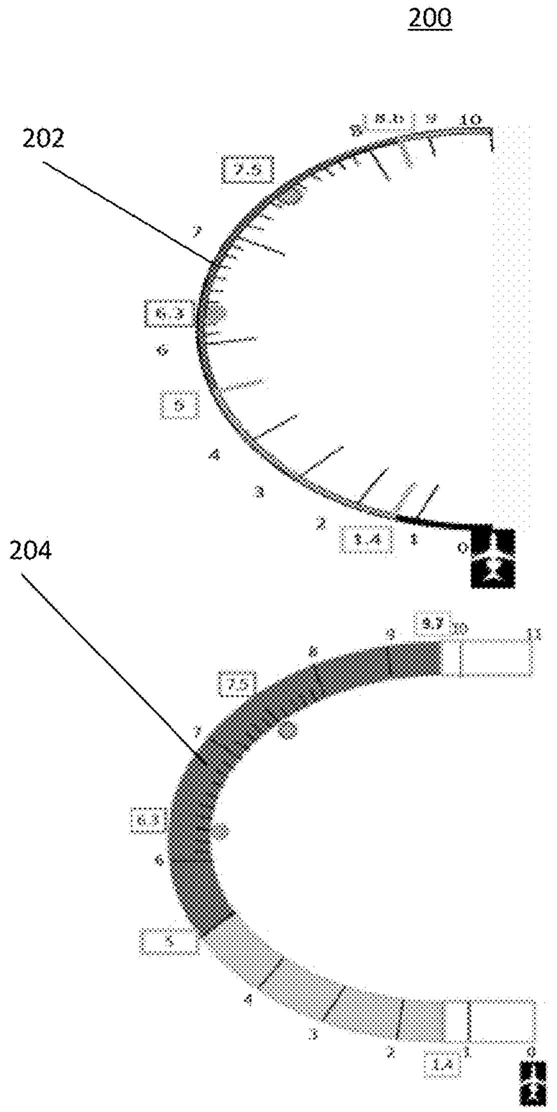
FIGS. 2A and 2B show examples of a traffic separation displays in accordance with some embodiments.
Figure 2B:
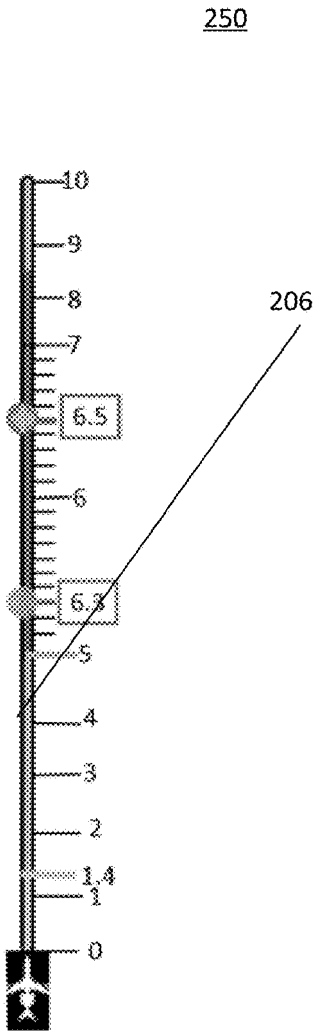

Turning now to FIGS. 2A and 2B, examples 200 and 250 are shown of a traffic separation displays in accordance with some embodiments. In current embodiments, a non-linear scale displays both the current separation and trend of the predicted separation between the ownship aircraft and the designated traffic. The separation trend distance is computed by current differential in ground speed (between the traffic and ownship) multiplied by a fixed time interval. This is a predicted separation position following the time interval and is represented on the same nonlinear display scale. Various examples of the adjusted nonlinear scales 202 and 204 are shown in FIG. 2A with the current separation being 7.5 NM while the predicted separation position being 6.3 NM. FIG. 2B shows an alternative two dimensional (2D) nonlinear display scale 206 with the current separation being 6.5 NM while the predicted separation position being 6.3 NM.

Figure 3A:
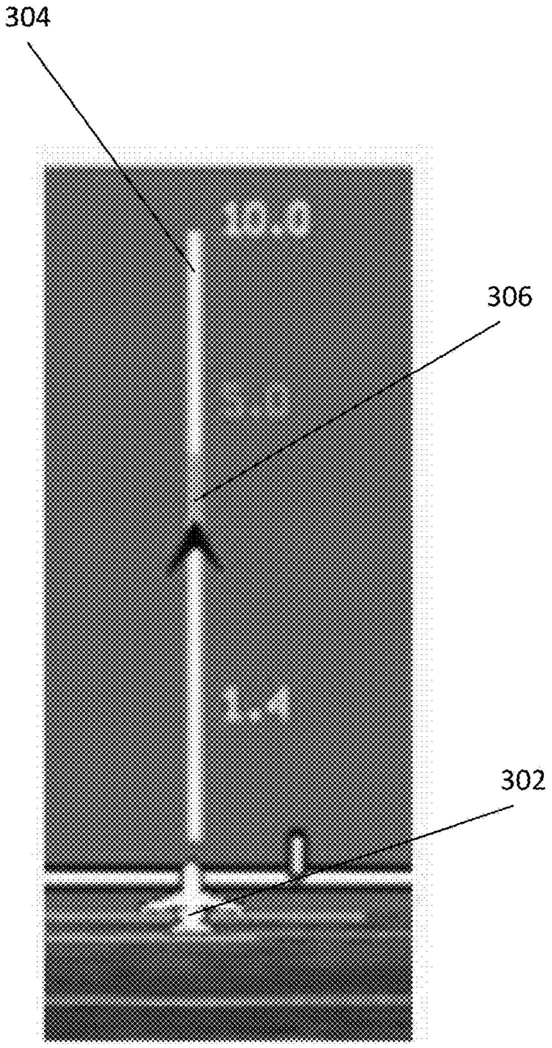
FIGS. 3A and 3B show examples of a traffic separation displays with warning zones in accordance with some embodiments.
Figure 3B:
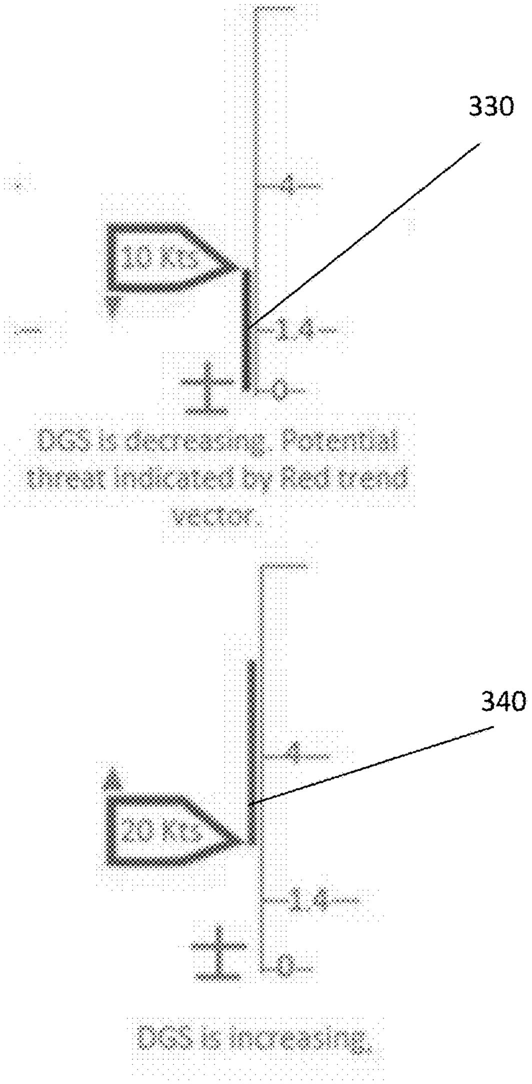

Turning now to FIGS. 3A and 3B, examples are shown of traffic separation displays with warning zones in accordance with some embodiments. In some embodiments, the separation distance scale is divided into multiple zones based on a required separation distance between the ownship and TTF. The present example has four separate zones as follows: a "caution zone" where the predicted separation distance is less than an Airborne Surveillance and Separation Assurance Processing (ASSAP) threshold; a "primary advisory zone" where the predicted separation distance is between the ASSAP threshold and a required minimum separation distance; a "green zone" where the predicted separation distance is between the required minimum separation distance and an efficiency threshold beyond which the spacing of air traffic becomes inefficient in that air traffic is not being delivered to a runway efficiently due to sizable gaps between arriving aircraft; and a secondary advisory zone where the predicted separation distance is beyond the efficiency threshold.

FIG. 3A shows a 2D separation distance display 304 with an ownship icon 302 and a separation zone indicator 306. The separation distance scale display 304 features an ownship icon 302 that is same as the icon used on the horizontal situation indicator (HSI) or the lateral deviation scale to depict the ownship. The separation distance readout will indicate the current separation distance. The color of the readout outline and/or background will be based on the separation zone for the designated traffic icon. FIG. 3B shows examples 330 and 340 of color outlined separation zone indicators on a separation distance readout.

Alternatively, graphical representation of the zones may indicate if the zone represents safe separation zone or needs caution and/or action from pilot in order to maintain safe separation. The zone indicators may use various colors (e.g., red, amber, cyan or green) or ghosting (e.g., hatching) to indicate an emphasis or deemphasis. In other examples, a caution zone may use a specific color only when designated traffic is near or in caution zone. For example, the color of the designated icon of the ownship may use an amber color only when designated traffic is near or in the "caution zone" and cyan color when in the "primary advisory zone" and green color when in the "green zone".

Figure 4A:
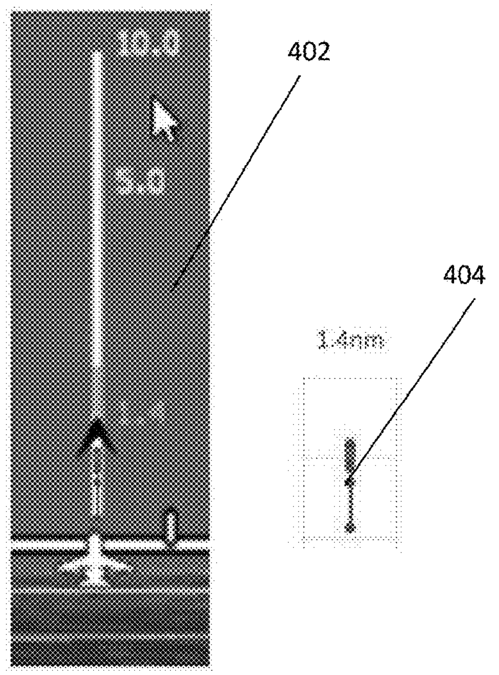
FIGS. 4A, 4B and 4C show examples of a traffic separation displays with non-linear scales in accordance with some embodiments.
Figure 4B:
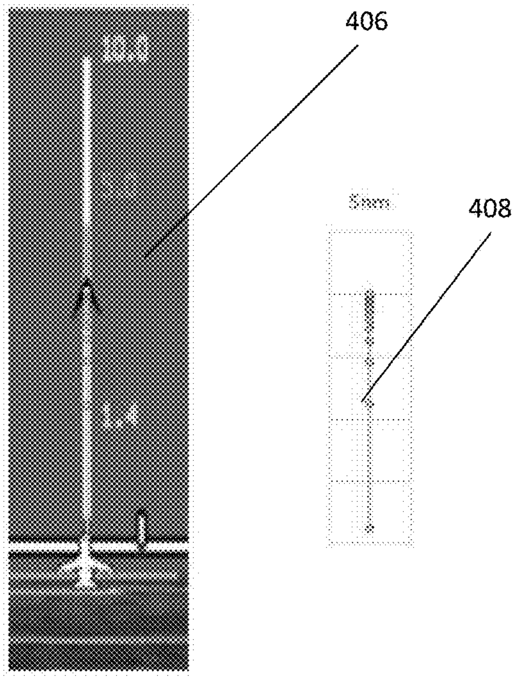
Figure 4C:
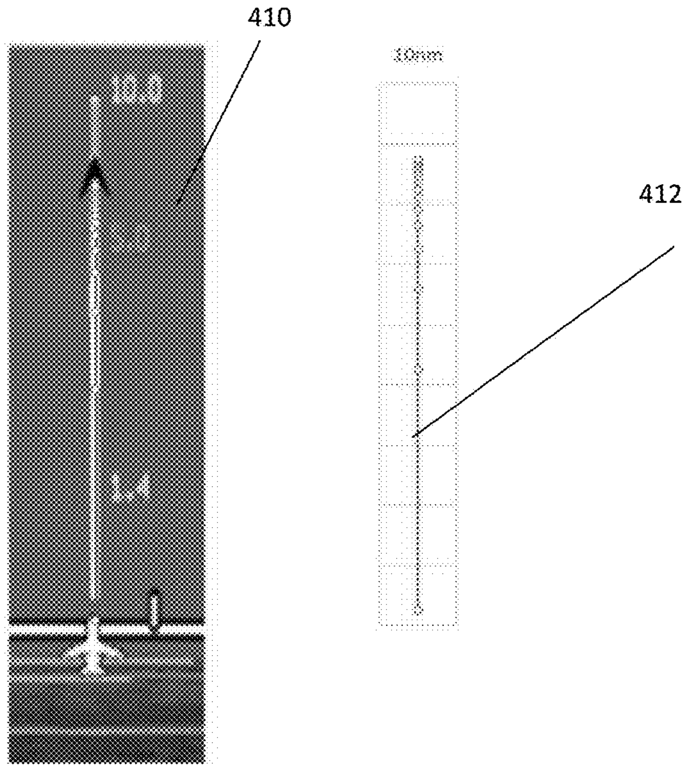

FIGS. 4A, 4B and 4C show examples of traffic separation displays with non-linear scales in accordance with some embodiments. In some embodiments, the cockpit display of traffic information (CDTI) is capable of displaying the horizontal range to the designated traffic with a typical resolution of 0.1 NM for values less than 10 NM. The graphical representation with such resolution would clutter the display. As a result, a dynamically changing non-linear scale may be used to provide a higher resolution based on one or more of the following conditions: at a current separation distance of the designated traffic from the ownship; at a zone transition area; within a specific zone (e.g., caution zone); and up to a separation distance threshold (e.g., minimum separation distance, efficiency threshold). A higher resolution of the scale may be for a configurable range around the current separation distance or from the current separation distance to predicted separation distance.

The non-linear scale will be compressed beyond the high-resolution area as mentioned previously. To enable a more intuitive display of compression for the pilot and case the ability to determine the distance readings, a set of pixels (i.e., dots) are used on the scale, where the space between each pixel to the next is 1/Nth of the distance to the designated traffic. Here 'N' is a value chosen proportional to the display size. FIG. 4A shows an example of a separation display 402 with a 1.4 NM compression scale 404. FIG. 4B shows an example of a separation display 406 with a 5 NM compression scale 408. FIG. 4C shows an example of a separation display 410 with a 510 NM compression scale 412.

Figure 5:
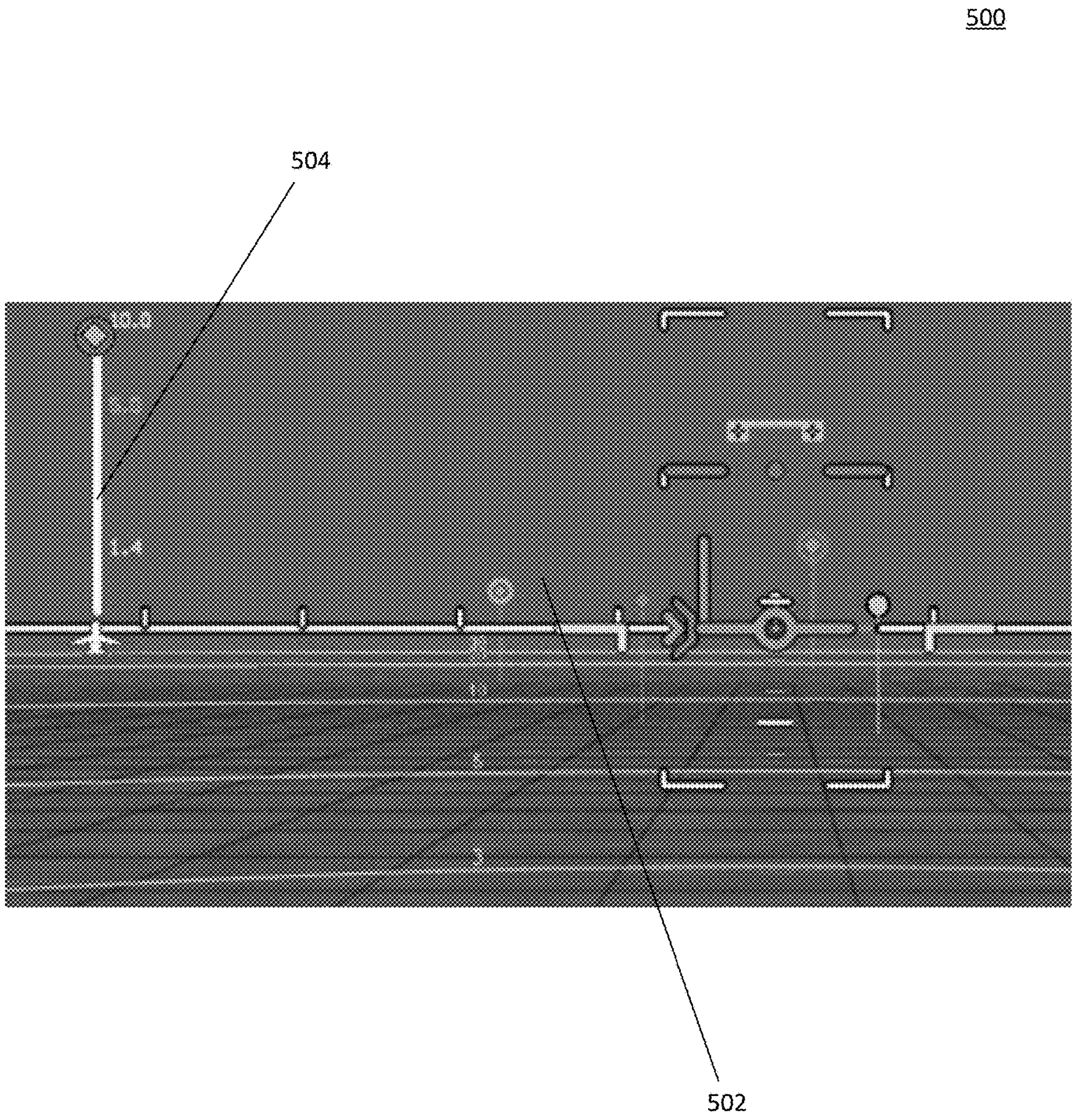
FIG. 5 shows a three dimensional (3D) traffic display with a two dimensional (2D) separation display in accordance with some embodiments.

Turning now to FIG. 5, a three-dimensional (3D) traffic display 502 is shown with a two-dimensional (2D) separation display 504 in accordance with some embodiments. In this embodiment, the 2D separation distance scale 504 is part of the integrated traffic awareness display where in the designated traffic icon that is same as the icon used for the designated 3D traffic symbol icon and the CDTI traffic symbol icon. In this embodiment, the designated traffic icon on the separation distance scale is a 2D icon with bright colors and a thick halo without a tether line to distinguish it from the traffic symbol which is a 3D perspective symbol with a tether line.

Figure 6:
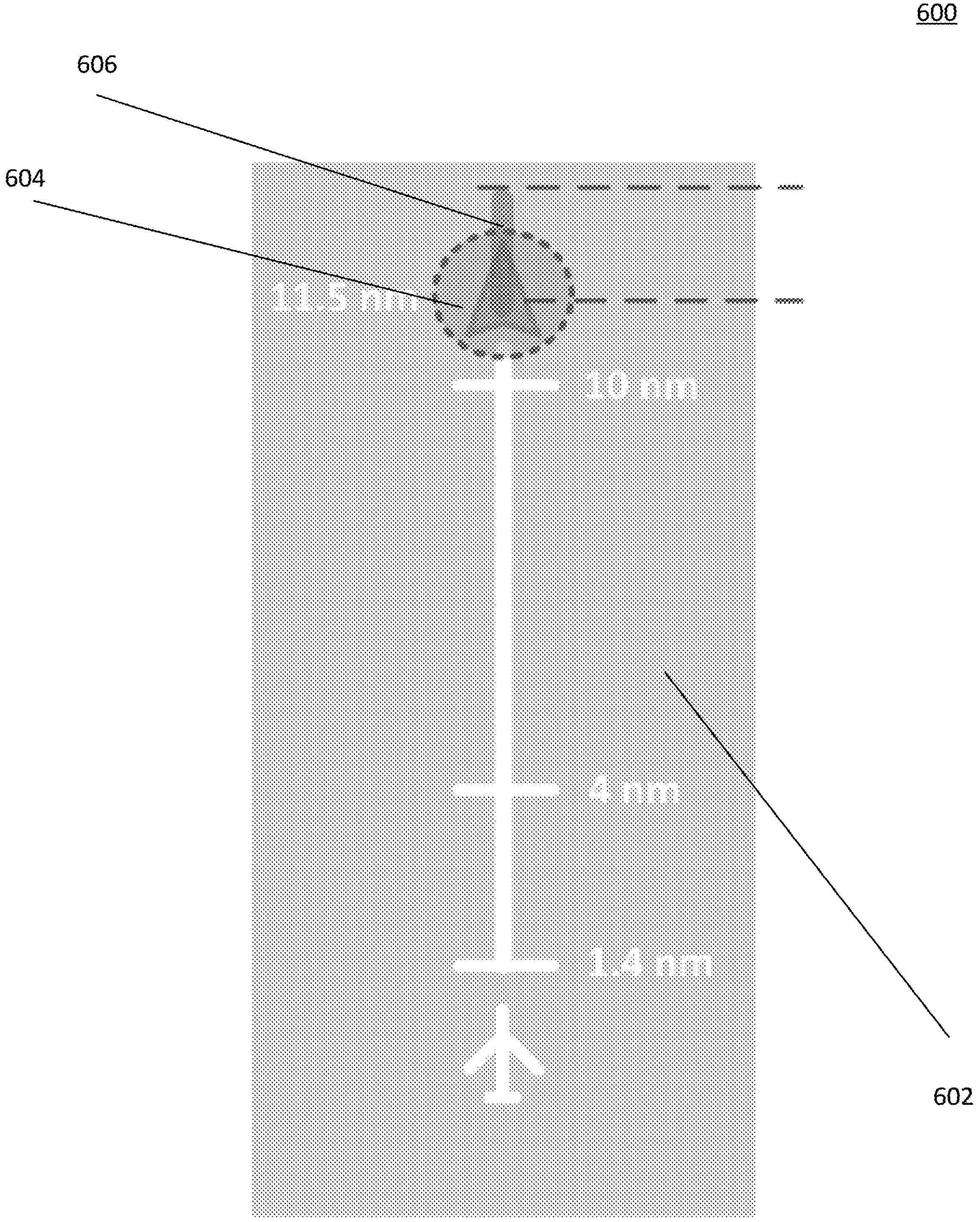
FIG. 6 shows a traffic separation display for an out of range aircraft in accordance with some embodiments.

Turning now to FIG. 6, a traffic separation display 602 is shown for an out of range aircraft 604 in accordance with some embodiments. As part of the symbol representation, the outline for the readout 606 becomes dashed when the distance between the designated traffic and ownship is more than some specific threshold which indicates that it is out of range of the non-linear scale. The separation distance scale also features a deemphasized designated traffic symbol icon or a trend line that represents the predicted future separation distance of the designated traffic after a configurable amount of time. The color of the separation distance trend line could vary based on the zone the predicted future separation distance of the designated traffic. The outline for the readout pointer becomes dashed/ghosted when the distance between the designated traffic and own hip is more than some specific threshold or out of range of the scale.

Figure 7:
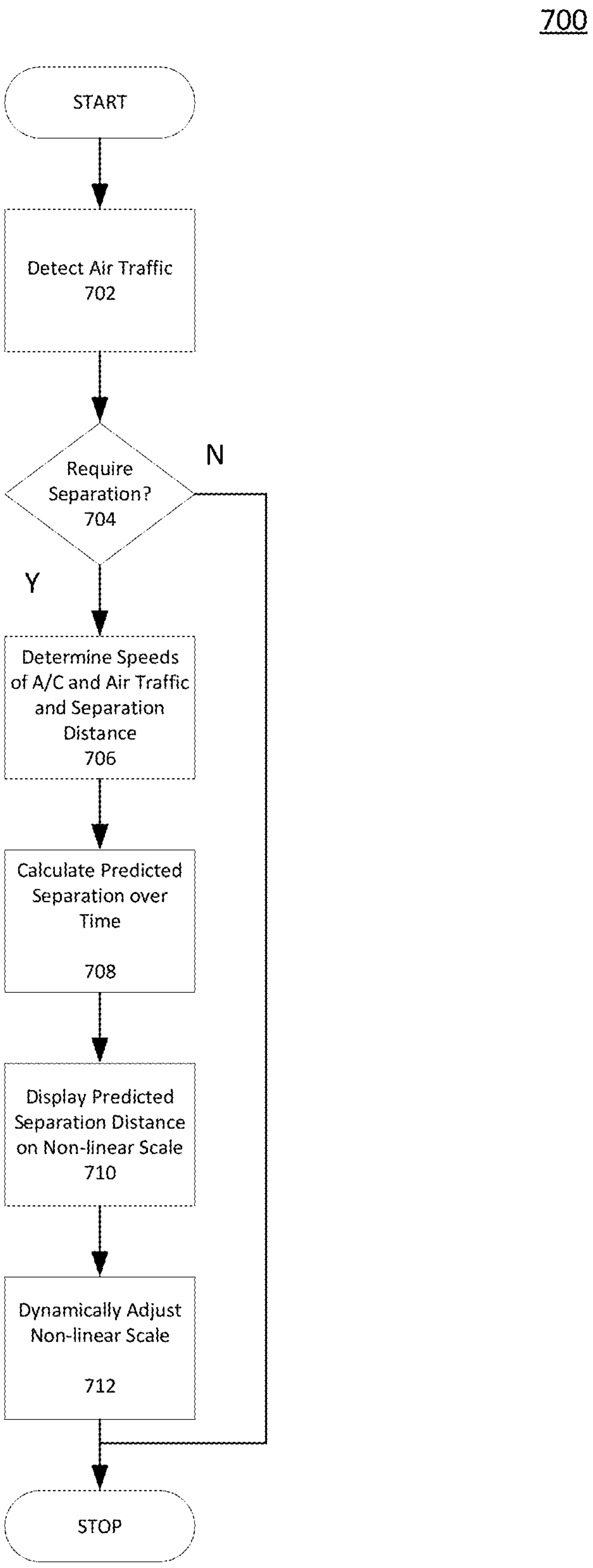
FIG. 7 shows a flow chart for a method to intuitively represent the separation of aircraft traffic in accordance with some embodiments.

Turning now to FIG. 7, a flow chart 700 is shown for a method to intuitively represent the separation of aircraft traffic in accordance with some embodiments. First, air traffic is detected 702 which requires maintenance of a separation distance from an ownship aircraft 704. The ground speed of the ownship, the ground speed of the air traffic and the current separation distance is determined 706. A predicted separation distance is calculated following a specific time interval 708. The specific time interval is configurable within the system (e.g., predicted separation distance in 30 seconds or one minute). The predicted separation distance between the air traffic and the ownship is based on a differential in ground speed between the air traffic and the ownship and the time interval. The location of the air traffic, the separation distance and the predicted separation distance are all shown on a graphical display onboard the ownship 710. The separation distance and the predicted separation distance are represented on a non-linear scale on the graphical display. The non-linear scale is dynamically adjusted as the air traffic approaches the predicted separation distance 712.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence.

For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for dynamically representing the separation for air traffic, comprising:

detecting air traffic requiring maintenance of a separation distance from an ownship aircraft;

determining a ground speed of the ownship aircraft;

determining a ground speed of the air traffic and a current separation distance from the ownship aircraft;

calculating a predicted separation distance following a specific time interval, where the predicted separation distance between the air traffic and the ownship aircraft is based on a differential in ground speed between the air traffic and the ownship aircraft and the specific time interval; and displaying the location of the air traffic, the separation distance and the predicted separation distance on a graphical display onboard the ownship aircraft, where the separation distance and the predicted separation distance are represented on a non-linear scale that provides a higher resolution of the separation distance by compressing the non-linear scale as the separation distance increases on the graphical display.

2. The method of claim 1, further comprising:

dynamically adjusting the non-linear scale on the graphical display as the air traffic approaches the predicted separation distance.

3. The method of claim 1, where the non-linear scale is broken into multiple separate zones based on a required separation distance.

4. The method of claim 3, where the zones are color coded to visually indicate the predicted separation distance.

5. The method of claim 4, where the zones are color coded within a background display of the location of the air traffic.

6. The method of claim 3, where one of the separate zones is a caution zone where the predicted separation distance is less than an Airborne Surveillance and Separation Assurance Processing (ASSAP) threshold.

7. The method of claim 6, where one of the separate zones is a primary advisory zone where the predicted separation distance is between the ASSAP threshold and a required minimum separation distance.

8. The method of claim 3, where one of the separate zones is a green zone where the predicted separation distance is between the required minimum separation distance and an efficiency threshold, where the efficiency threshold is a separation distance beyond which the spacing of air traffic becomes inefficient.

9. The method of claim 3, where one of the separate zones is a secondary advisory zone where the predicted separation distance is beyond an efficiency threshold.

10. The method of claim 1, where the graphical display that displays the location of the air traffic, the separation distance and the predicted separation distance indicates if pilot action is needed.

11. The method of claim 1, where the graphical display that displays the location of the air traffic, the separation distance and the predicted separation distance indicates if air traffic is currently out of range.

12. The method of claim 11, where the air traffic that is currently out of range is indicated by a hatching icon to deemphasize its display.

13. A system for dynamically representing the separation for air traffic, comprising:

a control module located onboard the ownship aircraft, where the control module, detects air traffic requiring maintenance of a separation distance from an ownship aircraft, determines a ground speed of the ownship aircraft, determines a ground speed of the air traffic and a current separation distance from the ownship aircraft, and calculates a predicted separation distance following a specific time interval, where the predicted separation distance between the air traffic and the ownship aircraft is based on a differential in ground speed between the air traffic and the ownship aircraft and the specific time interval; and a display system located onboard the ownship aircraft, where the display system, displays the location of the air traffic, the separation distance and the predicted separation distance on a graphical display onboard the ownship aircraft, where the separation distance and the predicted separation distance are represented on a non-linear scale on the graphical display, and dynamically adjusts the non-linear scale that provides a higher resolution of the separation distance by compressing the non-linear scale as the separation distance increases on the graphical display as the air traffic approaches the predicted separation distance.

14. The system of claim 13, where the non-linear scale is broken into multiple separate zones based on the predicted separation distance.

15. The system of claim 14, where the zones are color coded to visually indicate the predicted separation distance.

16. The system of claim 15, where the zones are color coded within a background display of the location of the air traffic.

17. The system of claim 14, where one of the separate zones is a caution zone where the predicted separation distance is less than an Airborne Surveillance and Separation Assurance Processing (ASSAP) threshold.

18. The system of claim 17, where one of the separate zones is a primary advisory zone where the predicted separation distance is between the ASSAP threshold and a required minimum separation distance.

19. The system of claim 14, where one of the separate zones is a green zone where the predicted separation distance is between the required minimum separation distance and an efficiency threshold, where the efficiency threshold is a separation distance beyond which the spacing of air traffic becomes inefficient.

20. The system of claim 14, where one of the separate zones is a secondary advisory zone where the predicted separation distance is beyond an efficiency threshold.

* * * * *